(12) United States Patent
Colas et al.

(10) Patent No.: US 11,720,343 B2
(45) Date of Patent: *Aug. 8, 2023

(54) METHODS AND APPARATUS FOR AUTOMATICALLY LABELING DATA PROCESSING EVENTS IN AUTONOMOUS DRIVING VEHICLES VIA MACHINE LEARNING

(71) Applicant: PlusAI, Inc., Santa Clara, CA (US)

(72) Inventors: Gael Gurvan Colas, San Mateo, CA (US); Mayank Gupta, Mountain View, CA (US); Anurag Ganguli, Saratoga, CA (US); Timothy P. Daly, Jr., San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,014

(22) Filed: Nov. 4, 2022

(65) Prior Publication Data

US 2023/0221944 A1   Jul. 13, 2023

Related U.S. Application Data

(63) Continuation of application No. 17/571,424, filed on Jan. 7, 2022, now Pat. No. 11,520,576.

(51) Int. Cl.
*G06F 8/65* (2018.01)
*G06N 20/00* (2019.01)

(52) U.S. Cl.
CPC .............. *G06F 8/65* (2013.01); *G06N 20/00* (2019.01)

(58) Field of Classification Search
USPC ........................................................ 717/168
See application file for complete search history.

(56) References Cited

U.S. PATENT DOCUMENTS

| 9,177,259 | B1 * | 11/2015 | Levchuk | G06N 20/00 |
| 10,298,444 | B2 * | 5/2019 | Bishnoi | H04L 41/069 |
| 10,394,946 | B2 * | 8/2019 | Miller | G06F 16/2477 |
| 11,017,321 | B1 * | 5/2021 | Mishra | G05B 23/0283 |
| 11,042,155 | B2 * | 6/2021 | Zheng | G06N 20/00 |

(Continued)

OTHER PUBLICATIONS

U.S. Appl. No. 17/571,419, filed Jan. 7, 2022.
What is Model Training, Oden Technologies Website, Jul. 30, 2020, 5 pages; https://oden.io/glossary/model-training/.

*Primary Examiner* — Qing Chen
*Assistant Examiner* — Clint Thatcher
(74) *Attorney, Agent, or Firm* — Sheppard Mullin Richter & Hampton LLP (57) ABSTRACT

In some embodiments, a method comprises receiving, at a processor of an autonomous vehicle and from at least one sensor, sensor data distributed within a time window. A first event being a first event type occurring at a first time in the time window is identified by the processor using a software model based on the sensor data. At least one first attribute associated with the first event is extracted by the processor. A second event being the first event type occurring at a second time in the time window is identified by the processor based on the at least one first attribute. In response to determining that the second event is not yet recognized as being the first event type, a first label for the second event is generated by the processor.

20 Claims, 5 Drawing Sheets

(56) References Cited

U.S. PATENT DOCUMENTS

| | | | |
|---|---|---|---|
| 2014/0052679 A1* | 2/2014 | Sinyavskiy | G06N 3/10 |
| | | | 706/44 |
| 2015/0324686 A1* | 11/2015 | Julian | G06N 3/08 |
| | | | 706/25 |
| 2016/0232032 A1* | 8/2016 | Azvine | G06F 21/552 |
| 2018/0218269 A1* | 8/2018 | Oliner | G06F 16/26 |
| 2020/0065711 A1* | 2/2020 | Clément | G07C 5/085 |
| 2020/0342152 A1* | 10/2020 | Van der Velden | G06F 30/27 |
| 2021/0256420 A1* | 8/2021 | Elisha | G06N 5/04 |
| 2021/0272394 A1* | 9/2021 | Cella | G06N 3/045 |
| 2021/0319219 A1* | 10/2021 | Kale | G06N 3/088 |
| 2021/0327308 A1* | 10/2021 | Payton | G06F 18/2148 |
| 2022/0080977 A1* | 3/2022 | Ucar | G01S 13/931 |
| 2022/0292605 A1* | 9/2022 | Sanchez | G06V 10/764 |

* cited by examiner

METHODS AND APPARATUS FOR AUTOMATICALLY LABELING DATA PROCESSING EVENTS IN AUTONOMOUS DRIVING VEHICLES VIA MACHINE LEARNING

CROSS-REFERENCE TO RELATED APPLICATIONS

This application is a continuation of U.S. patent application Ser. No. 17/571,424, filed on Jan. 7, 2022 and entitled "METHODS AND APPARATUS FOR AUTOMATICALLY LABELING DATA PROCESSING EVENTS IN AUTONOMOUS DRIVING VEHICLES VIA MACHINE LEARNING", which is incorporated in its entirety herein by reference.

FIELD

In one or more embodiments, data processing events from an autonomous driving vehicle are automatically labelled retrospectively.

BACKGROUND

Machine learning (ML) models can be used by autonomous vehicles to make a range of decisions that have real-world consequences. These ML models are often trained using labelled datasets. Generating these labelled datasets, however, can be very time-intensive, expensive, and unsatisfactory. Thus, a need exists to improve the generation of labelled datasets for use with ML models.

SUMMARY

In some embodiments, a method comprises receiving, by a processor located at an autonomous vehicle and from at least one sensor, sensor data distributed within a time window. A software model identifies a first event being a first event type occurring at a first time in the time window using the sensor data. At least one attribute of at least one of an object, place, or action associated with the first event is extracted. A second event being the first event type occurring at a second time in the time window and prior to the first time is identified based on the at least one attribute, the second event not yet recognized as being the first event type prior to at least one of the identifying of the first event or the identifying of the second event. The second event is labelled with a first label. A third event being a second event type different than the first event type occurring at a third time in the time window and prior to the first time is identified, the third event incorrectly recognized as being the first event type prior to at least one of the identifying of the first event or the identifying of the third event. The third event is labelled with a second label different from the first label. The software model is updated using the second event, the first label, the third event, and the second label to generate an updated software model.

In some embodiments, a method comprises generating, by a processor located at an autonomous vehicle, an expected movement of an object. Sensor data distributed within a time window is received by the processor located at the autonomous vehicle and from at least one sensor, the sensor data including a representation of an actual movement of the object. A first event being a first event type and occurring at a first time in the time window is identified by the software model based on the sensor data, the first event type being associated with a discrepancy between the expected movement and the actual movement. At least one attribute associated with the first event is extracted. At least one of: (1) a second event being the first event type at a second time in the time window, the second event not yet identified as being the first event type prior to the identifying of the second event, or (2) a third event being a second event type different than the first event type at a third time in the time window, the third event incorrectly identified as the first event type prior to the identifying of the third event is identified in the time window and using the at least one attribute. At least one label associated with at least one of the second event or the third event is generated. The software model is updated using at least one of (1) the second event and the at least one label, or (2) the third event and the at least one label to generate an updated software model.

In some embodiments, a method comprises receiving, at a processor associated with an autonomous vehicle, sensor data collected from at least one sensor and distributed within a time window. A first event being a first event type occurring at a first time in the time window is identified by the processor using a software model based on the sensor data. At least one first attribute associated with the first event is extracted by the processor. A second event being the first event type occurring at a second time in the time window is identified by the processor based on the at least one first attribute. In response to determining that the second event is not yet recognized as being the first event type, a first label for the second event is generated by the processor.

DETAILED DESCRIPTION

Events in temporal sensor data can be detected by applications using automatic ground truth labeling. In many time series or temporal data applications, it can be desirable to identify and label such events to develop methodologies to better detect them in the future. When the amount of data is large, however, it may be undesirable and/or not possible to label such events manually given timing constraints, because manually labelling can time consuming, labor intensive, and expensive; such shortcomings can result is lower quality training datasets, and in turn, lower quality software models (e.g., machine learning models) due to the lower quality training datasets. Such lower quality software models can have undesirable effects for autonomous vehicles in particular because autonomous vehicles rely on such software models to make driving decisions. By examining the data before and/or after the event, it can be possible to algorithmically detect the event with confidence in the future (i.e., after the event has already occurred). Autonomous driving data is an example application of interest. The time series data can include sensor data from sensors (e.g., camera, radar, lidar), and/or various outputs (e.g., perception tracking output, prediction intent output, control command output). Example events of interest include detecting false positive or false negative objects in perception, detecting shoulder vehicles, detecting unexpected movements, and detecting lane path tracking errors. The techniques described herein can be desirable for software models used by autonomous vehicles to better detect events, thereby enabling the autonomous vehicles to operate more safely. For example, the techniques described herein can cause an autonomous vehicle to perform a maneuver that would have otherwise caused harm had the maneuver not be performed. As another example, the techniques described herein can cause an autonomous vehicle to refrain from performing a maneuver that would have otherwise caused harm had the maneuver been performed. Thus, the techniques discussed herein, when applied to semi-autonomous and/or fully-autonomous vehicles, can improve operability of the vehicle.

A time window of sensor data (also referred to herein as "temporal sensor data") can be examined to identify events of interest retrospectively for automatic ground truth labeling. By detecting a known event, information associated with that known event can be used to identify and generate labels for additional occurrences of that event type. These updated labels can then be used as training data to improve machine learning models that can more accurately identify future instances related to those events of interest. The techniques discussed herein can provide such labels automatically without needing human intervention. As a result, improved machine learning models can be generated quickly and autonomously.

For the sake of simplicity, embodiments will be discussed within the context of autonomous vehicles. It can be appreciated however, that the techniques discussed herein can be applied within a myriad of other contexts where it can be desirable to generate and/or update labels for previous occurrences of events.

Figure 1:
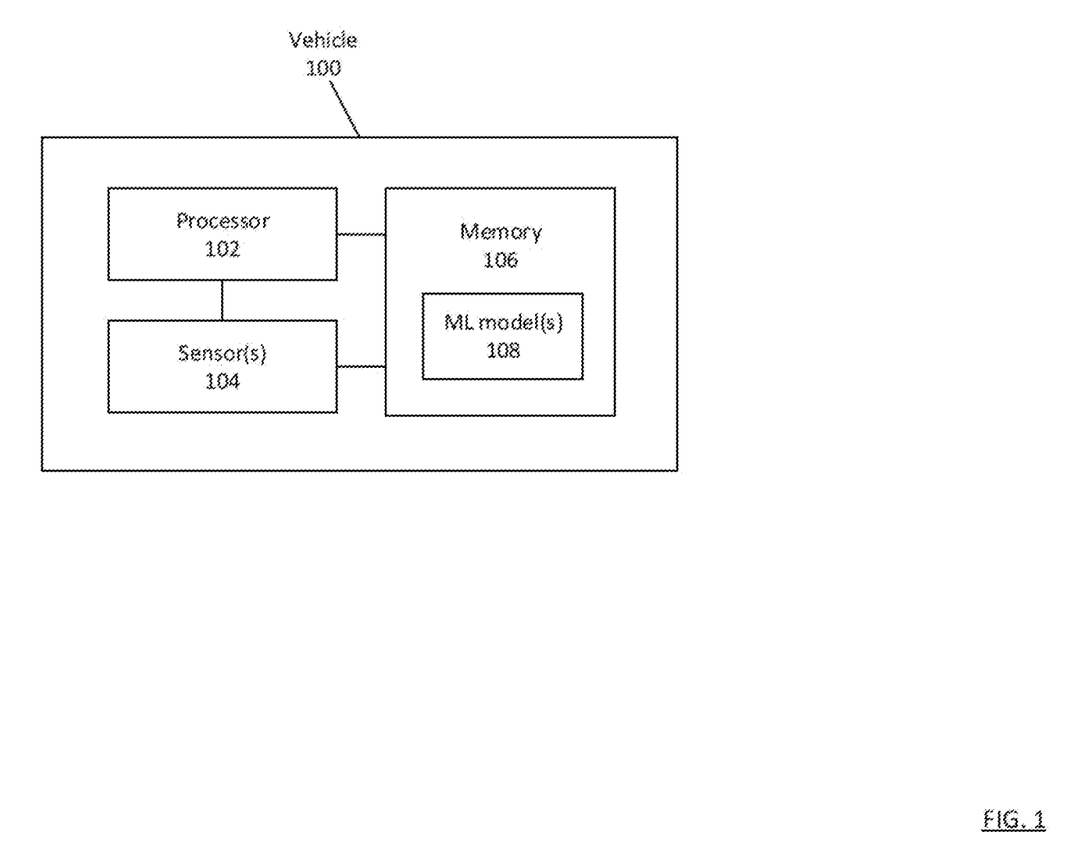
FIG. 1 shows a block diagram of an autonomous vehicle system, according to an embodiment.

FIG. 1 shows a block diagram of a vehicle 100, according to an embodiment. The vehicle 100 includes a processor 102, sensor(s) 104, and a memory 106 including ML model(s) 108. The vehicle 100 can be a semi-autonomous or autonomous vehicle.

The processor 102 can be, for example, a hardware based integrated circuit (IC) or any other suitable processing device configured to run and/or execute a set of instructions or code. For example, the processor 102 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 can be operatively coupled to the memory 106 and sensor(s) 104 through a system bus (for example, address bus, data bus and/or control bus). In some implementations, the processor 102 can be configured to run any of the methods and/or portions of methods discussed herein.

The sensor(s) 104 can include one or more sensors for collecting sensor data. The sensor(s) 104 can be used to observe and gather any information that would be useful for performing the techniques discussed herein, such as information associated with a surrounding environment of the vehicle 100 and/or the vehicle 100 itself. Sensor(s) 104 can include, for example, a camera, radar, and/or lidar. The sensor(s) 104 can collect sensor data that includes representations of attributes associated with the vehicle 100 (e.g., speed, location, acceleration, size, weight, etc. of the vehicle), and/or a surrounding of the vehicle 100 (e.g., speed, location, acceleration, size, type, relative distance, audio, etc. of other vehicle's dynamics, pedestrians, animals, signs, obstacles, lane markers, shoulder areas, etc.).

The memory 106 can be, for example, a random-access memory (RAM), a memory buffer, a hard drive, a read-only memory (ROM), an erasable programmable read-only memory (EPROM), and/or the like. The memory 106 can be configured to store sensor data collected by the sensor(s) 104, ML model(s) 108, data received from a separate compute device (not shown), and any other data needed by the processor 102 to perform the techniques discussed herein. In some instances, the memory 106 can store, for example, one or more software programs and/or code that can include instructions to cause the processor 102 to perform one or more processes, functions, and/or the like. In some embodiments, the memory 106 can include extendable storage units that can be added and used incrementally. In some implementations, the memory 106 can be a portable memory (for example, a flash drive, a portable hard disk, and/or the like) that can be operatively coupled to the processor 102. In some instances, the memory 106 can be remotely operatively coupled with the compute device. For example, a remote database device (not shown) can serve as a memory and be operatively coupled to the vehicle 100.

The ML model(s) 108 (also referred to herein as "software model") can be used to analyze a time window of sensor data collected by the sensor(s) 104 to identify an occurrence of an event having an event type. The ML model(s) 108 can use, for example, supervised learning, semi-supervised learning, or unsupervised learning. In some implementations, the ML model(s) 108 use, for example, a naïve bayes classifier, k-means clustering, linear regression, logistic regression, neural network, decision tree, random forest, nearest neighbors, or a combination thereof. An event type can refer to, for example, an event kind/category/genre/class, and the event can refer to, for example, an actual instance of that event type (e.g., the event type is lane cut-ins, and the event is an actual occurrence of a vehicle (different than vehicle 100) cutting into a lane). The event type can be any event type of interest. In some implementations, the event type can be a discrepancy between an expected movement of an object (e.g., the vehicle 100, a nearby vehicle, a pedestrian) and an actual movement of the object, a particular driving maneuver (e.g., lane cut-in), or detecting an object (e.g., shouldered vehicle).

The ML model(s) 108 can also be used to extract one or more attributes (i.e., features) associated with identified events, where the attribute(s) can help identify previously unidentified occurrences of the same event type (which can be the same event or a different event) in the time window of sensor data, correct previously-identified occurrences of events that are the same event type but incorrectly identified as being a different event type, and/or correct previously-identified occurrences of events incorrectly identified as being the event type of interest. The attributes can be qualitative and/or quantitative. As a first example, attributes can include color, shape, size, relative location, absolute location, speed, movement pattern, unique identifier (e.g., license plate), or any other relevant attribute of an object (e.g., nearby vehicle, pedestrian, obstacle) associated with an identified event(s). As a second example, attributes can include color, weather, relative location, absolute location, size, shape, unique identifier, curvature, boundaries, grade, or any other relevant attribute of a place (e.g., shoulder area, road) associated with an identified event(s). As a third example, attributes can include duration, speed, movement pattern, relative location, absolute location, or any other relevant attribute of an action (e.g., driving maneuver) associated with an identified event(s). As a fourth example, attributes can represent features or mathematical functions operating on sensor data or sequences of sensor data outputting a vector of real or imaginary numbers. Specific examples include computer vision descriptors such as Scale Invariant Feature Transform (SIFT) or intermediate layer outputs from a convolutional neural network. In some implementations, the extracted attribute(s) can represent a threshold value, where other attributes of the same type with values less than the extracted attribute(s) can be considered as an occurrence of an event. In some implementations, the extracted attribute(s) can represent a threshold value, where other attributes of the same type with values greater than the extracted attribute(s) can be considered as an occurrence of an event. In some implementations, the extracted attribute(s) can represent a middle value in a range, where other attributes of the same type with values within a predetermined range relative to the extracted attribute(s) (e.g., ±10%, ±25%, ±50%) can be considered as an occurrence of an event. In some implementations, identifying a predetermined set of one or more attributes can be considered as an occurrence of an event. In some implementations, identifying a minimum number of attributes from a list of predetermined attributes can be considered as an occurrence of an event.

In some implementations, the ML model(s) 108 can identify events of particular event types and/or attributes associated with the events using detection techniques such as Support Vector Machines, Random Forests, convolutional neural networks, recursive neural networks and their variants. Unsupervised learning-based techniques such as k-means clustering can also be used for detecting events that are different from previously encountered sensor data. In some implementations, the ML model(s) 108 can generate a confidence metric indicating how confident the ML model(s) 108 is that the event is truly an occurrence of the event type of interest. If the confidence metric is above a predetermined threshold (e.g., 99% sure the event truly is the event type of interest), the event can be identified as being the event type. Additional discussion related to event/attribute detection can be found in U.S. Pat. No. 11,042,155, the contents of which are incorporated in its entirety herein.

Events can be identified, for example, using sensor data distributed within a time window. The time window of sensor data can refer to sensor data collected over a period of time that is greater than zero. The sensor data can be distributed within the time window according to any distribution, such as evenly, unevenly, spanning the entire time window, and/or spanning portions of the time window (i.e., the time window can include one or more gaps without sensor data). In some implementations, the time window can begin when the sensor(s) 104 starts to collect data, and end when the sensor(s) 104 stops collecting data.

Upon identifying previously unidentified occurrences of the same event type in the time window, one or more labels can be generated (e.g., false-positive, false-negative, updated object identification label, updated action identification label). One or more labels can also be generated upon identifying previously identified occurrences of events incorrectly identified as being the event type of interest (e.g., false-positive, false-negative, updated object identification label, updated action identification label). Thereafter, these newly labelled events can be used to update (i.e., retrain) the ML model(s) 108 so that the ML model(s) 108 can better identify future events of the event type.

Although not shown in FIG. 1, some implementations can include a communicator that is a hardware device operatively coupled to the processor 102 and memory 106. The communicator can be, for example, a network interface card (NIC), a Wi-Fi® module, a Bluetooth® module and/or any other suitable wired and/or wireless communication device. Furthermore, the communicator can include a switch, a router, a hub and/or any other network device. In some instances, the communicator can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some implementations, the communicator can be used to facilitate vehicle-to-everything (V2X) communication (e.g., vehicle-to-vehicle, vehicle-to-pedestrian, vehicle-to-infrastructure).

In some implementations, although not shown in FIG. 1, the ML model(s) 108 can be stored in a compute device separate from the vehicle 100 (e.g., a server). Additionally, ML model(s) 108 can be trained using sensor data from sensors at different vehicles, where the additional sensor data can be used to generate additional training data. Thus, the ML model(s) 108 can be updated with labels generated using local sensor data (i.e., using sensor(s) 104 from the vehicle 100) and/or using global sensor data (i.e., using sensor data from multiple vehicles).

In some implementations, the vehicle 100 can be used to generate labels where the event/event type is a discrepancy between an expected movement for the vehicle 100 and the actual movement for the vehicle 100. For example, the vehicle 100 can include a perception generator (not shown in FIG. 1) that generates an expected path of travel for the vehicle 100 at a given area. In other words, the perception generator can output a representation of a predicted path that the vehicle 100 will take. Additionally, the sensor(s) 104 can be used to capture sensor data, and the sensor data can be used to determine an actual path of travel for the vehicle 100 at that given area. Thereafter, the ML model(s) 108 and/or a human can analyze the predicted path of travel and the actual path of travel, and identify an event where the predicted path of travel materially differs from the actual path of travel. "Materially discrepant", "material discrepancy", "discrepancy", "discrepant", or similar variation thereof can refer to, for example, a difference/discrepancy between two or more values that is outside an acceptable range (e.g., greater than a predetermined maximum, less than a predetermined minimum, a percentage (e.g., 10%, 25%, 50%) beyond a predetermined acceptable value, etc.). The acceptable range can be set at a default value and/or tuned based on a particular use case (e.g., by a human, by a software model based on parameters associated with the particular use case). In some implementations, a (material) discrepancy can refer to a distance between an expected movement and an actual movement that is greater than a predetermined value, such as 15 feet or 30 feet. After identifying the event, an attribute(s) associated with the event, such as a lateral offset or curve shape (e.g., lateral offset values over a time period) between the actual path of travel and predicted path of travel can be extracted. Thereafter, the vehicle 100 can analyze a time window of previously-collected sensor data by the sensor(s) 104 to identify, using the attribute(s), (1) a previously unidentified event(s) where the predicted path of travel was materially different from the actual path of travel (e.g., where the previously unidentified event(s) has lateral offsets and/or curve shapes within a predetermined range relative to the identified event), and/or (2) a previously identified occurrence(s) of an event(s) incorrectly identified as having a material discrepancy between the predicted path of travel and actual path of travel (e.g., where the extracted lateral offset and/or curve shape are not within a predetermined range relative to the identified event). A label(s) can then be generated for the event. In some implementations, a label(s) for a previously unidentified event(s) where the predicted path of travel was materially discrepant with the actual path of travel can indicate that there was a material discrepancy and/or that the event was a false-negative. In some implementations, a label(s) for a previously-identified occurrence(s) of an event(s) incorrectly identified as having a material discrepancy between the predicted path of travel and actual path of travel can indicate that there was not a material discrepancy and/or that the event was a false-positive. The labels/associated events can be used to re-train the ML model(s) 108 and generate an updated ML model(s) 108. The updated ML model(s) 108 can be used to better determine future events where there is a material discrepancy between a predicted path of travel and actual path of travel and/or where there is not a material discrepancy between a predicted path of travel and actual path of travel.

In some implementations, the vehicle 100 can be used to generate labels where the event/event type is another vehicle cutting in front of and into the same lane as the vehicle 100. The sensor(s) 104 can collect sensor data over all or portions of a time window, and an occurrence of an event where a lane cut-in occurred can be identified by the ML model(s) 108. Attributes associated with that lane cut-in event can be extracted, such as the movement pattern of the vehicle cutting in, a distance between the vehicle cutting in and the vehicle 100, an amount of time between the vehicle cutting in initiating its blinkers and entering the same lane as the vehicle 100, etc. Thereafter, the vehicle 100 can analyze the time window of sensor data to identify, using the attribute(s), (1) a previously-unidentified event(s) where a lane cut-in occurred (e.g., where a different vehicle had a similar movement pattern, where a different vehicle switched into the same lane at a distance less than the extracted distance attribute), and/or (2) a previously-identified occurrence(s) of an event(s) incorrectly identified as a lane cut-in (e.g., where a different vehicle switched into the same lane as the vehicle 100, but at a distance much further ahead of the vehicle 100). A label(s) can then be generated for the event. In some implementations, a label(s) for a previously-unidentified event(s) where a lane cut-in occurred can indicate that a lane cut-in occurred and/or that the event was a false-negative. In some implementations, a label(s) for a previously-identified occurrence(s) of an event(s) where a lane cut-in did not occur can indicate that a lane cut-in did not occur and/or that the event was a false-positive. The labels/associated events can be used to re-train the ML model(s) 108 and generate an updated ML model(s) 108. The updated ML model(s) 108 can be used to better determine future events where a lane cut-in occurs and/or where a lane cut-in does not occur.

In some implementations, the vehicle 100 can be used to generate labels where the event/event type is a material discrepancy between an expected (predicted) movement of an object near the vehicle 100 (e.g., a nearby AV, pedestrian, cyclist, shouldered vehicle) and an actual movement of that object. The memory 106 can include one or more object history logs (not shown in FIG. 1) that include information associated with movement of that object and/or other objects of the same type (e.g., movement pattern, speed, displacement from the vehicle 100). The object history log can be used, by the ML model(s) 108, to predict an expected movement of the object, while sensor data from the sensor(s) 104 can be used to determine an actual movement of the object. The ML model(s) 108 can then be used to identify an occurrence of an event where the expected movement of the object is materially discrepant with the actual movement of the object. Attributes associated with that material discrepancy can be extracted, such as the actual movement of that object, the speed of that object, the displacement of that object relative to the vehicle 100, etc. Thereafter, the vehicle 100 can analyze a time window of previously-collected sensor data by the sensor(s) 104 to identify, using the attribute(s), (1) a previously unidentified event(s) where the expected movement of the object was materially discrepant with the actual movement of the object (e.g., where the previously-unidentified event(s) has similar movement patterns to the identified event), and/or (2) a previously-identified occurrence(s) of an event(s) incorrectly identified as having a material discrepancy between the expected movement of the object and the actual path of movement of the object (e.g., where the movement patterns do not indicate a discrepancy). A label(s) can then be generated for the event. In some implementations, a label(s) for a previously-unidentified event(s) where the expected movement was materially discrepant with the actual movement can indicate that there was a material discrepancy and/or that the event was a false-negative. In some implementations, a label(s) for a previously-identified occurrence(s) of an event(s) incorrectly identified as having a material discrepancy between the expected movement and actual movement can indicate that there was not a material discrepancy and/or that the event was a false-positive. The labels/associated events can be used to re-train the ML model(s) 108 and generate an updated ML model(s) 108. The updated ML model(s) 108 can be used to better identify future events where a material discrepancy occurs between an expected movement of that object type and an actual movement of that object type and/or where a material discrepancy does not occur between an expected movement of that object type and an actual movement of that object type.

In some implementations, the vehicle 100 can be used to generate labels where the event/event type is detecting a vehicle at a shoulder of a drivable area near a vicinity (e.g., in front of, adjacent to) of the vehicle 100. The ML model(s) 108 can be used to identify an occurrence of an event where a vehicle, is located at a shoulder. Additional details related to identifying shouldered vehicles can be found in U.S. patent application Ser. No. 17/571,419, titled "Methods and Apparatus for Navigation of an Autonomous Vehicle Based on a Location of the Autonomous Vehicle Relative to Shouldered Objects," filed Jan. 7, 2022, the content of which is incorporated by reference in its entirety herein. Attributes associated with the shouldered vehicle can be extracted, such as the relative and/or absolute location of the shouldered vehicle, the shape of the shouldered vehicle, the color of the shouldered vehicle, an identifier of the shouldered vehicle (e.g., license plate number), a movement pattern of the shouldered vehicle, a speed of the shouldered vehicle, etc. Thereafter, the vehicle 100 can analyze a time window of previously-collected sensor data by the sensor(s) 104 (and distributed within all or portions of the time window) to identify, using the attribute(s), (1) a previously-unidentified event(s) where there was a shouldered vehicle (e.g., where the previously-unidentified event(s) has the same license plate number and same absolute location to the identified event), and/or (2) a previously-identified occurrence(s) of an event(s) incorrectly identified as a shouldered vehicle (e.g., where the shape of the incorrectly-supposed shoulder vehicle in the previously unidentified event(s) is different than the shouldered vehicle in identified event). A label(s) can then be generated for the event. In some implementations, a label(s) for a previously-unidentified event(s) where a shouldered vehicle was in fact present can indicate that a shouldered vehicle was present and/or that the event was a false-negative. In some implementations, a label(s) for a previously-identified occurrence(s) of an event(s) incorrectly identified as being a shouldered vehicle can indicate that a shouldered vehicle was not present and/or that the event was a false-positive. The labels/associated events can be used to re-train the ML model(s) 108 and generate an updated ML model(s) 108. The updated ML model(s) 108 can be used to better identify future events where a shouldered vehicle is present and/or where a shouldered vehicle is not present.

In some implementations, the vehicle 100 is can be a medium truck, heavy truck, very heavy truck, greater than 14,000 pounds, and/or greater than 26,000 pounds. In some implementations, the sensor(s) 104 is a long-range sensor. The techniques discussed herein can be desirable for larger/heavier vehicles because detecting events accurately and/or sooner can be more critical compared to smaller/lighter vehicles because such larger/heavier vehicles typically need more time to perform a remedial action.

Figure 2A:
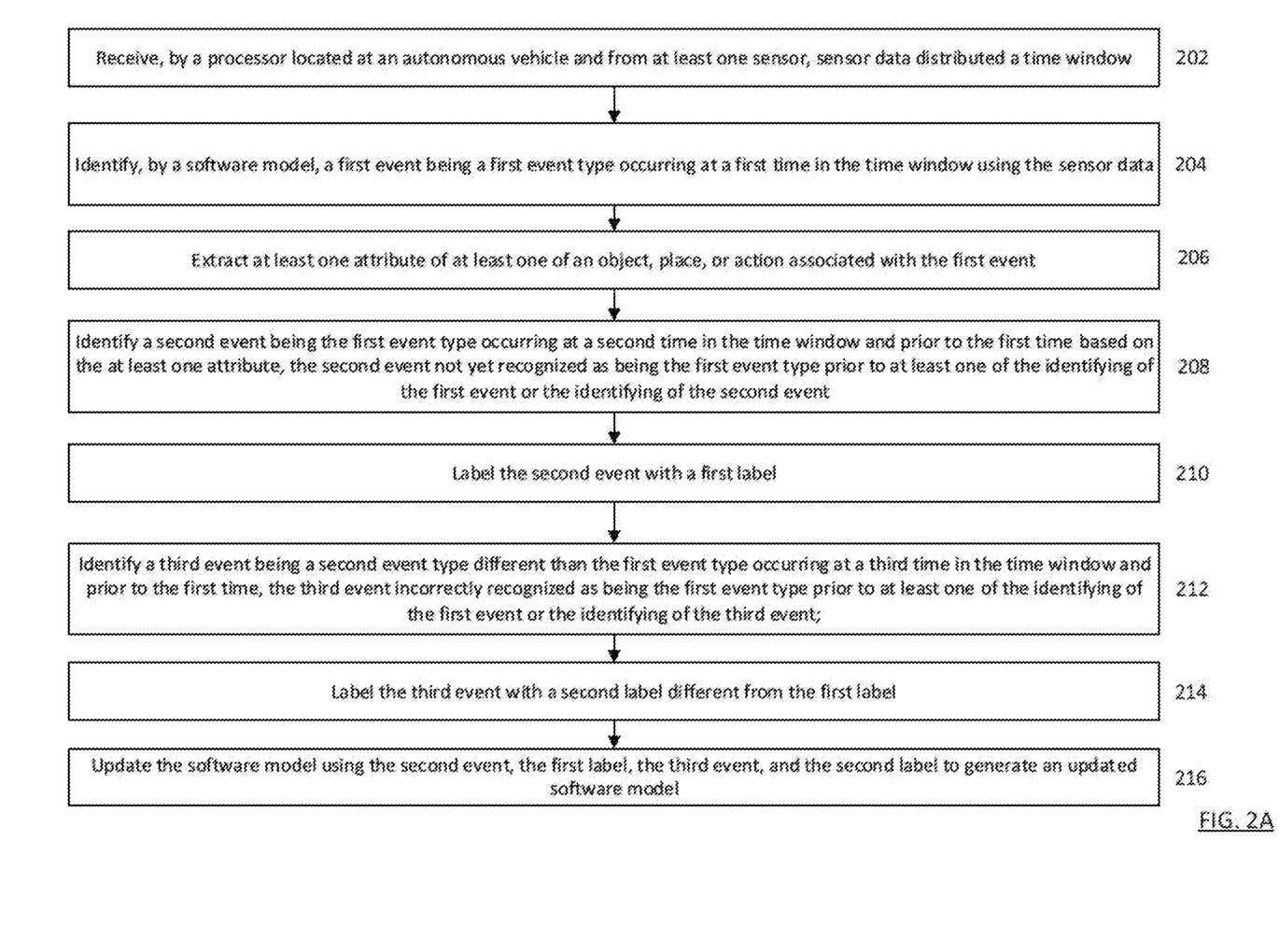
FIG. 2A shows a flowchart of a method for generating labels retrospectively to update a software model, according to an embodiment.
Figure 2B:
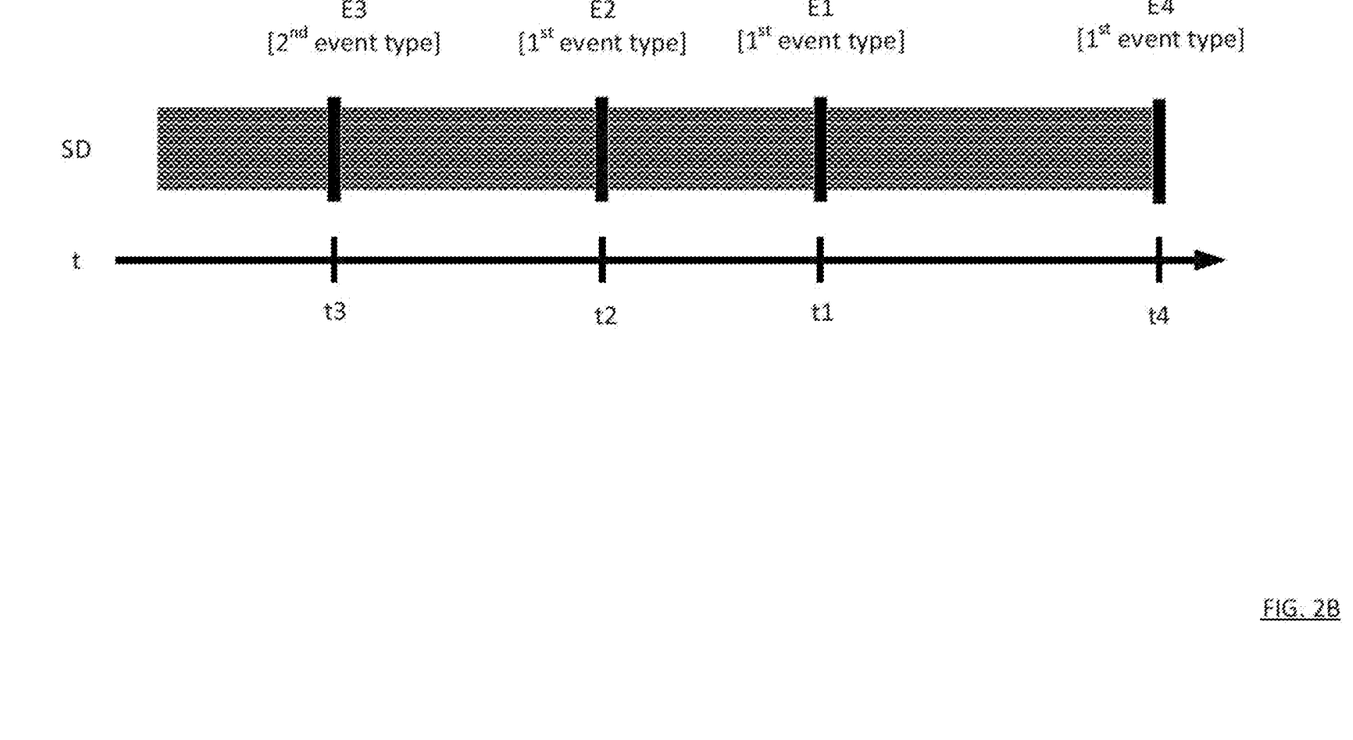
FIG. 2B shows an example of multiple events detected at different times within a time window of sensor data, according to an embodiment.

FIG. 2A shows a flowchart of a method for identifying previously unidentified events of an event type of interest, and identifying events incorrectly identified as being the event type of interest, according to an embodiment. FIG. 2B shows a diagram that illustrates an example of the first, second, third, and fourth events/times discussed with respect to FIG. 2A, according to an embodiment.

Referring to FIG. 2A, at 202, sensor data distributed within a time window is received from at least one sensor (e.g., sensor(s) 104) by a processor (e.g., processor 102) located at an autonomous vehicle (vehicle 100). Said similarly, the at least one sensor collects temporal sensor data. 202 can be performed while the vehicle 100 is moving, stationary, or both. The time window can be any time period greater than zero. For example, FIG. 2B shows a representation of sensor data SD distributed over a time window t, where time progresses from left to right.

Referring back to FIG. 2A, at 204, a first event being a first event type occurring at a first time in the time window is identified by a software model (e.g., ML model(s) 108) based on the sensor data. In some implementations, the first event is identified as the first event by the software model if a confidence metric generated by the model and associated with the potential identification of the first event as being the first event type is above a predetermined threshold (e.g., 95% confident that the first event is the first event type). In some implementations, a software model can identify a first event that is the first event type, and receive confirmation via a human input thereafter that the first event truly is of the first event type before proceeding to 206. For example, FIG. 2B shows a first event E1 being a first event type occurring at a first time t1 in the time window t.

Referring back to FIG. 2A, at 206, at least one attribute of at least one of an object, place, or action associated with the first event is extracted. As a first example, attributes can include color, shape, size, relative location, absolute location, speed, movement pattern, unique identifier (e.g., license plate), or any other relevant attribute of an object (e.g., nearby vehicle, pedestrian, obstacle) associated with an identified event(s). As a second example, attributes can include color, weather, relative location, absolute location, size, shape, unique identifier, curvature, boundaries, grade, or any other relevant attribute of a place (e.g., shoulder area, road) associated with an identified event(s). As a third example, attributes can include duration, speed, movement pattern, relative location, absolute location, or any other relevant attribute of an action (e.g., driving maneuver) associated with an identified event(s). In some implementations, 206 can be performed by the model from 204.

At 208, a second event being the first event type at a second time in the time window and prior to the first time is identified based on the at least one attribute, the second event not yet recognized as being the first event type prior to at least one of the identifying of the first event (i.e., prior to 204) or the identifying of the second event (i.e., prior to 208). The second event can be different than the first event. For example, FIG. 2B shows a second event E2 being the first event type at a second time t2 in the time window t prior to the first time t1. The second event E2 was not yet recognized as being the first event type prior to t1 and/or t2.

Referring back to FIG. 2A, at 210, the second event is labelled with a first label. The first label can be any label that would be useful for re-training the model used to identify the first event at 204. For example, the first label can indicate that the second event is a false-positive, false-negative, discrepancy, not a discrepancy, a cut in, not a cut in, shouldered object, not a shouldered object, etc.

At 212, a third event being a second event type different than the first event type at a third time in the time window and prior to the first time is identified, the third event incorrectly recognized as being the first event type prior to the identifying of the third event (i.e., prior to 212). The third time can be same as or different than the second time since they are different events and different event types. For example, FIG. 2B shows a third event E3 being a second event type different than the first event type at a third time t3 in the time window t that is prior to the first time t1. The third event E3 was incorrectly recognized as being the first event type prior to the identifying of the first event E1 at the first time t1 and/or third event E3 at the third time t3. Also note that the third time t3 occurred prior to the second time t2 in FIG. 2B, but in other examples, the second time t2 can occur prior to the third time t3 and/or the third time t3 can occur at the same time as the second time t2.

Referring back to FIG. 2A, at 214, the third event is labelled with a second label different than the first label. Examples of labels for the second label can indicate that the second event is a false-positive, false-negative, a discrepancy, not a discrepancy, a cut in, not a cut in, shouldered object, not a shouldered object, etc.

At 216, the software model is updated using the second event, the first label, the third event, and the second label to generate an updated software model. The second event, the first label, the third event, and the second label can be used as training data to further refine the software model. Referring to the example shown in FIG. 2B, the updated software model can be generated after the first time t1 (but prior to the fourth time t4).

In some implementations, the method shown in FIG. 2A can further include identifying a fourth event being the first event type occurring at a fourth time after the first time using the updated software model. For example, FIG. 2B shows a fourth event E4 being the first event type occurring at a fourth time t4 after the first time t1 identified using the updated software model. Had the (original) software model been used (instead of the updated software model), a chance exists that the fourth event (e.g., fourth event E4) went unidentified. Thus, using the updated software model can cause, for example, the vehicle relying on the updated software model to perform different steering maneuvers that otherwise would not have been performed had the fourth event went unidentified and/or refrain from performing a steering maneuver that otherwise would have been performed. In some implementations, the order of steps can be rearranged and/or performed in parallel. For example, 212 and 214 can be performed prior to or at the same time as 208 and 210.

Note that, for the method discussed with respect to FIG. 2A, the second and third events occurred prior to the first event. In other words, information associated with the first event can be used to identify events that occurred prior to the first event. In some implementations, the second and/or third event could have occurred after the first event. In other words, information associated with the first event can be used to identify events that occurred after the first event.

Figure 3:
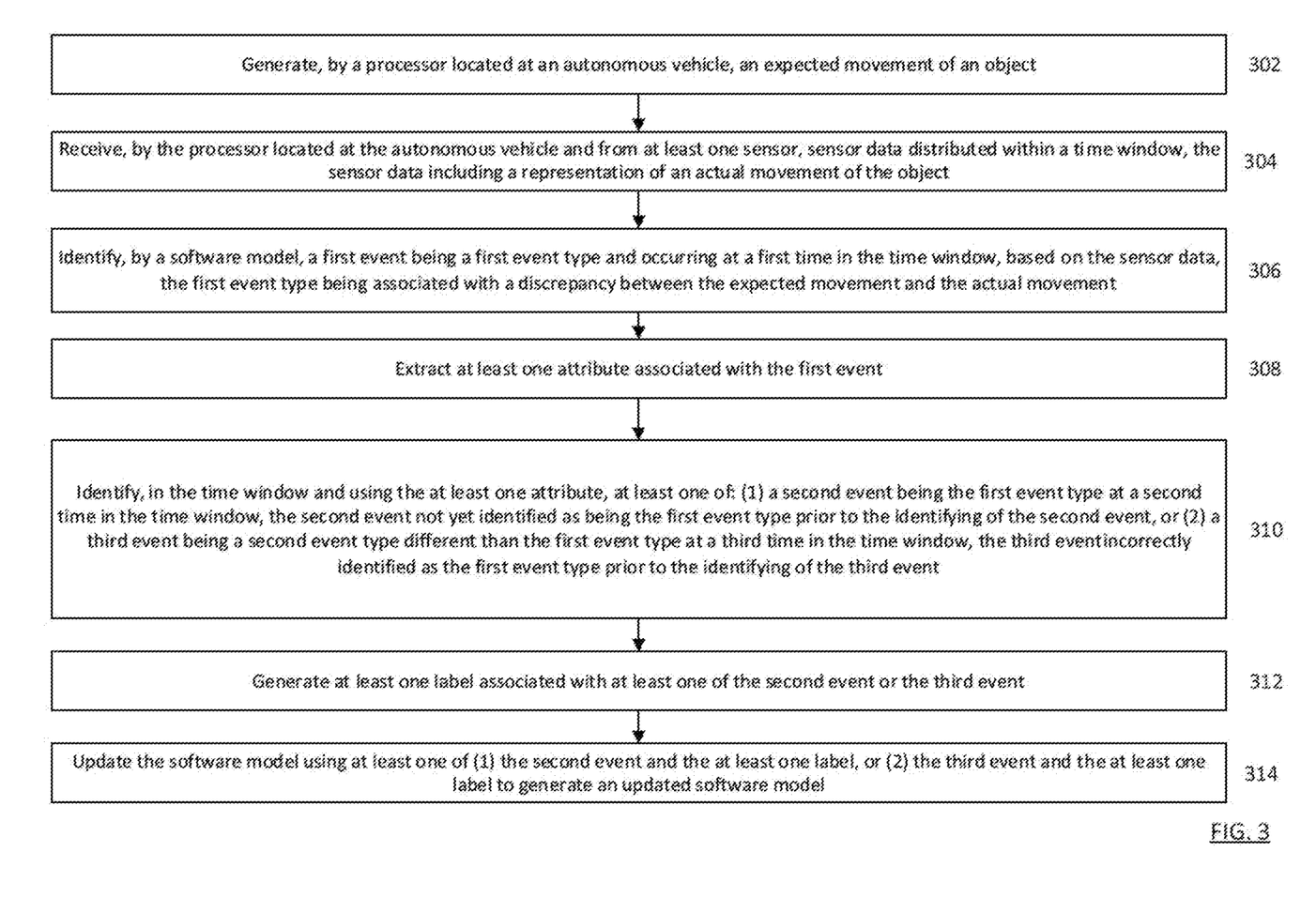
FIG. 3 shows a flowchart of a method for generating labels retrospectively to update a software model, according to an embodiment.

FIG. 3 shows a flowchart of a method for generating an additional label(s) to update a model, according to an embodiment. The method discussed with respect to FIG. 3 is similar to the method discussed with FIG. 2A.

At 302, an expected movement of an object is generated by a processor (e.g., processor 102) located at an autonomous vehicle (e.g., vehicle 100). The object can be the autonomous vehicle itself and/or an object in a surrounding area of the autonomous vehicle. The expected movement of the object can be based on, for example, perception generator output, prediction intent output, control command outputs, an object history log, or a combination thereof.

At 304, sensor data distributed within a time window is received from at least one sensor located at the autonomous vehicle (e.g., sensor(s) 104) by the processor located at the autonomous vehicle, the sensor data including a representation of an actual movement of the object.

At 306, a first event being a first event type and occurring at a first time in the time window is identified by a software model based on the sensor data, the first event type being associated with a material discrepancy between the expected movement and the actual movement. Examples of material discrepancies can include an actual speed being materially different than an expected speed, an actual path of travel being materially different than an expected path of travel, an actual acceleration being materially different than an expected acceleration, an actual movement pattern being materially different than an expected movement pattern, etc.

At 308, at least one attribute associated with the first event is extracted. The at least one attribute can be associated with an object, place and/or action associated with the first event. As a first example, attributes can include color, shape, size, relative location, absolute location, speed, movement pattern, unique identifier (e.g., license plate), or any other relevant attribute of an object (e.g., nearby vehicle, pedestrian, obstacle) associated with an identified event(s). As a second example, attributes can include color, weather, relative location, absolute location, size, shape, unique identifier, curvature, boundaries, grade, or any other relevant attribute of a place (e.g., shoulder area, road) associated with an identified event(s). As a third example, attributes can include duration, speed, movement pattern, relative location, absolute location, or any other relevant attribute of an action (e.g., driving maneuver) associated with an identified event(s.

At 310, at least one of: (1) a second event being the first event type at a second time in the time window, the second event not yet identified as being the first event type prior to the identifying of the second event (i.e., prior to 310), or (2) a third event being a second event type different than the first event type at a third time in the time window, the third event incorrectly identified as the first event type prior to the identifying of the third event (i.e., prior to 310), is identified in the time window using the at least one attribute. In some implementations of 310, both the second and third event are identified, and the second time is different than the third time. In some implementations, the second time and/or third time occur prior to the first time. In some implementations, the second time and/or third time occur after the first time.

At 312, at least one label associated with at least one of the second event or the third event is generated. The number of labels can be based, in part, on if the second event, third event, or both events were identified in 310. In some implementations, each event can be associated with multiple labels. At 314, the software model is updated using at least one of (1) the second event and the at least one label, or (2) the third event and the at least one label to generate an updated software model. The labels used in 314 are based on, in part, the event(s) identified at 310 and the labels generated at 312.

In some implementations, the method shown in FIG. 3 can further include identifying a fourth event being the first event type occurring at a fourth time after the first time using the updated software model. Had the software model been used (instead of the updated model), a chance exists that the fourth event went unidentified. Thus, using the updated software model can cause, for example, the vehicle relying on the updated software model to perform different steering maneuvers that otherwise would not have been performed if the updated software model hadn't identified the fourth event and/or refrain from performing a steering maneuver that otherwise would have been performed.

Figure 4:
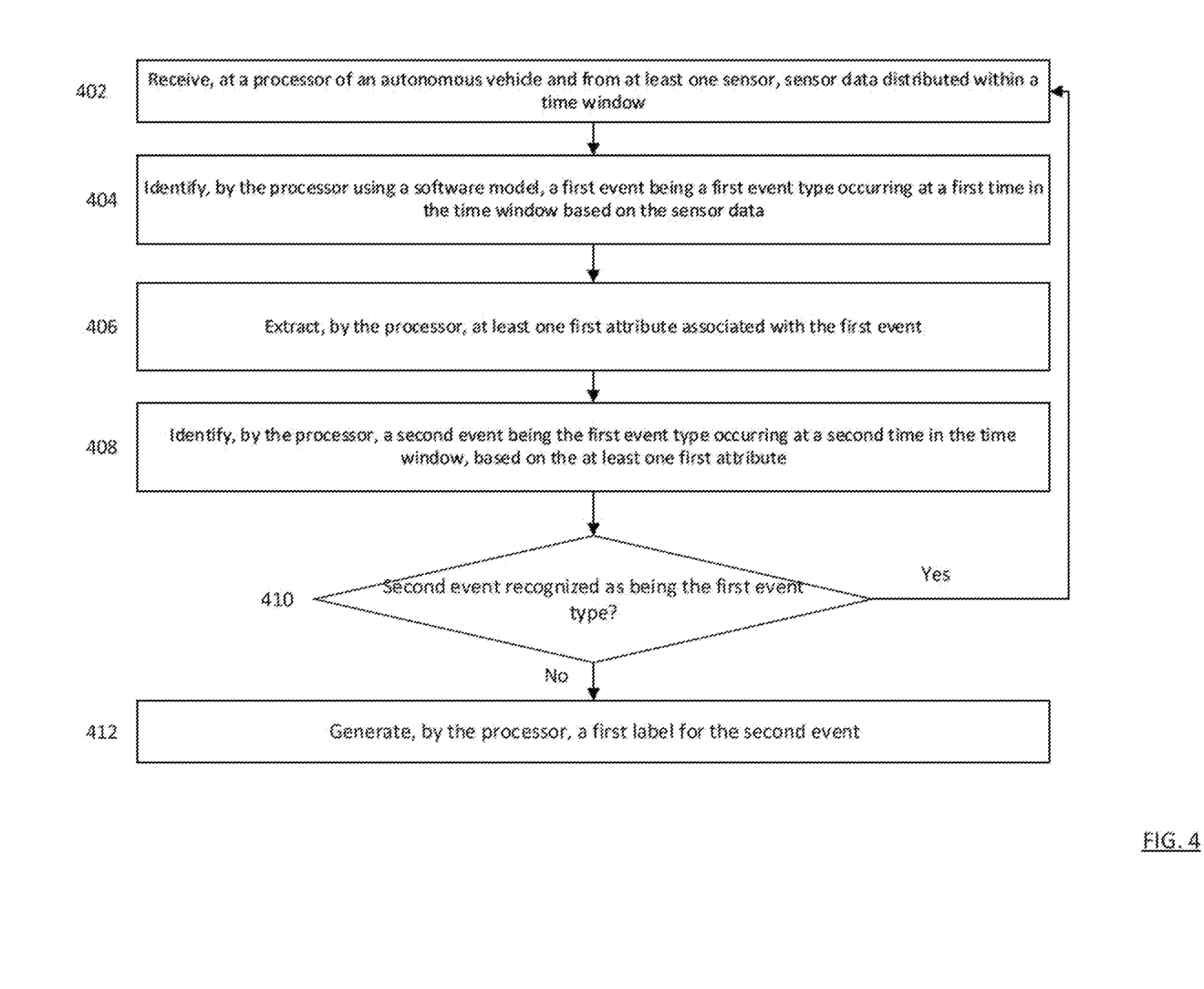
FIG. 4 shows a flowchart of a method for generating labels retrospectively to update a software model, according to an embodiment.

FIG. 4 shows a flowchart of a method for generating a label for a previously unidentified event, according to an embodiment. The method discussed with respect to FIG. 4 is similar to the methods discussed with respect to FIGS. 2A and 3. At 402, sensor data collected from at least one sensor (e.g., sensor(s) 104) and distributed within a time window is received at a processor (e.g., processor 101, or an offline (off-vehicle) processor) associated with an autonomous vehicle (e.g., vehicle 100). At 404, a first event being a first event type occurring at a first time in the time window is identified by the processor using a software model (e.g., ML model(s) 108) based on the sensor data. At 406, at least one first attribute associated with the first event is extracted by the processor. At 408, a second event being the first event type occurring at a second time in the time window is identified by the processor based on the at least one first attribute from 406. The second time can be before or after the first time. At 410, it is determined whether or not the second event is recognized as being the first event type. In some implementations, this can be determined by analyzing any labels already associated with the second event to determine if a label associated with the first event type already exists. If the answer at 410 is yes, return to 402. If the answer at 410 is not, proceed to 412. At 412, a first label for the second event is generated by the processor.

In some implementations, the method from FIG. 4 further includes (1) updating the software model using the second event and the first label to generate an updated software model, and (2) identifying the third event being the first event type occurring at a third time after the first time using the updated software model.

In some implementations, the method from FIG. 4 further includes identifying a third event being a second event type different from the first event type and occurring at a third time in the time window, based on using the sensor data. For example, if the first event type was detecting a shouldered vehicle, the second event type can be detecting a cut in. The method can further include extracting at least one second attribute associated with the third event. The method can further include identifying, based on the at least one second attribute, a fourth event being the second event type occurring at a fourth time in the time window that is prior to the third time. Furthermore, in response to determining that the fourth event is not yet recognized as being the second event type, a second label for the fourth event can be generated.

Furthermore, in some implementations, the method discussed in the previous paragraph can further include identifying, based on the sensor data, a fifth event being a third event type different than the first event type and the second event type occurring at a fifth time in the time window. For example, if the first event type was detecting a shouldered vehicle, and the second event type was detecting a cut in, the third event type can be identifying a discrepancy between an expected movement and an actual movement. The method can further includes extracting at least one third attribute associated with the fifth event, identifying a sixth event being the third event type occurring at a sixth time that is in the time window and that is prior to the fifth time based on the at least one third attribute, and generating a third label for the sixth event occurring at the sixth time.

In some implementations, the software model is a first software model and the identifying of the third event in the method discussed prior to the previous paragraph is performed by a second software model. The first software model and second software model can be a single software model or different software models. The first software model can be updated using the second event and the first label to generate an updated software model, and the second software model can be updated using the fourth event and the second label to generate an updated second software model. Furthermore, a fifth event being the first event type occurring at a fifth time after the first time can be identified using the updated first software model, and/or a sixth event being the second event type occurring at a sixth time after the third time can be identified using the updated second software model.

It can be appreciated that the methods discussed with respect to FIGS. 2, 3, and 4 can exist in various implementations without deviating concepts discussed above. For example, any number of previously-unidentified events and/or previously-incorrectly-identified events can be identified for generating appropriate labels and updating a model. Furthermore, the updated model can be used to identify any number of future instances of an event type. Any of these future instances of an event type and/or their associated labels can be used to retrain their respective models. Also note that any of the steps discussed with respect to FIGS. 2, 3, and 4 can be performed automatically without human input in response to completing the prior step. Also note that any of the steps discussed respect to FIGS. 2, 3, and 4 can be performed by the processor offline, online, or a combination thereof. In some implementations, offline processing can refer to processing occurring using a processor and/or memory not located with the autonomous vehicle (e.g., vehicle 100), and online processing can refer to processing occurring using a processor (e.g., processor 102) and/or memory located with the autonomous vehicle (e.g., vehicle 100). There are advantages and disadvantages to the processor being online and/or offline. In some scenarios, an advantage of the processor being offline is that the sensor data is recorded in the vehicle and transferred to the offline processor. In some scenarios, one advantage of offline processing over online processing is that the computational resources available may be greater, thereby, enabling the usage of more sophisticated and/or more computationally intense techniques such as bigger neural networks or ML models. In some scenarios, an advantage of the processor being online is that computations can be performed locally without needing to communicate over a network with external circuitry, which can reduce security risks (e.g., less prone to hacking).

In some embodiments, a method comprises: receiving, by a processor located at an autonomous vehicle and from at least one sensor, sensor data distributed within a time window; identifying, by a software model, a first event being a first event type occurring at a first time in the time window using the sensor data; extracting at least one attribute of at least one of an object, place, or action associated with the first event; identifying a second event being the first event type occurring at a second time in the time window and prior to the first time based on the at least one attribute, the second event not yet recognized as being the first event type prior to at least one of the identifying of the first event or the identifying of the second event; labelling the second event with a first label; identifying a third event being a second event type different than the first event type occurring at a third time in the time window and prior to the first time, the third event incorrectly recognized as being the first event type prior to at least one of the identifying of the first event or the identifying of the third event; labelling the third event with a second label different from the first label; and updating the software model using the second event, the first label, the third event, and the second label to generate an updated software model.

In some implementations, the first label indicates a false-negative, and the second label indicates a false-positive.

In some implementations, the autonomous vehicle is travelling in a lane, and the first event type is a vehicle cutting into the lane.

In some implementations, the sensor data includes a representation of a plurality of movements of the object, the first event type is a first movement from the plurality of movements of the object and having a discrepancy with an expected movement of the object, and the second event type is a second movement from the plurality of movements of the object and not having a discrepancy with the expected movement of the object.

Some implementations further comprise: identifying a fourth event being the first event type occurring at a fourth time after the first time using the updated software model.

In some implementations, the autonomous vehicle is a semi-truck.

In some embodiments, a method comprises: generating, by a processor located at an autonomous vehicle, an expected movement of an object; receiving, by the processor located at the autonomous vehicle and from at least one sensor, sensor data distributed within a time window, the sensor data including a representation of an actual movement of the object; identifying, by a software model, a first event being a first event type and occurring at a first time in the time window based on the sensor data, the first event type being associated with a discrepancy between the expected movement and the actual movement; extracting at least one attribute associated with the first event; identifying, in the time window and using the at least one attribute, at least one of: (1) a second event being the first event type at a second time in the time window, the second event not yet identified as being the first event type prior to the identifying of the second event, or (2) a third event being a second event type different than the first event type at a third time in the time window, the third event incorrectly identified as the first event type prior to the identifying of the third event; generating at least one label associated with at least one of the second event or the third event; and updating the software model using at least one of (1) the second event and the at least one label, or (2) the third event and the at least one label to generate an updated software model.

In some implementations, the object is the autonomous vehicle.

In some implementations, the at least one attribute includes a lateral offset between the expected movement and the actual movement during the first event.

In some implementations, at least one of the second time or the third time occur after the first time.

Some implementations further comprise: identifying a fourth event being the first event type occurring at a fourth time after the first time using the updated software model.

In some embodiments, a method comprises: receiving, at a processor associated with an autonomous vehicle, sensor data collected from at least one sensor and distributed within a time window; identifying, by the processor using a software model, a first event being a first event type occurring at a first time in the time window based on the sensor data; extracting, by the processor, at least one first attribute associated with the first event; identifying, by the processor, a second event being the first event type occurring at a second time in the time window based on the at least one first attribute; and in response to determining that the second event is not yet recognized as being the first event type, generating, by the processor, a first label for the second event.

In some implementations, the first event type is a vehicle at a shoulder of a drivable area, the vehicle present near a vicinity of the autonomous vehicle.

Some implementations further comprise: identifying, using the sensor data, a third event being a second event type different from the first event type and occurring at a third time in the time window; extracting at least one second attribute associated with the third event; identifying, based on the at least one second attribute, a fourth event being the second event type occurring at a fourth time in the time window that is prior to the third time; and in response to determining that the fourth event is not yet recognized as being the second event type, generating a second label for the fourth event.

In some implementations, the software model is a first software model and the identifying of the third event is performed by a second software model, the first software model and the second software model being one of a single software model or different software models, the method further comprising: updating the first software model using the second event and the first label to generate an updated first software model; and updating the second software model using the fourth event and the second label to generate an updated second software model.

Some implementations further comprise: identifying, based on the sensor data, a fifth event being a third event type different than the first event type and the second event type occurring at a fifth time in the time window; extracting at least one third attribute associated with the fifth event; identifying, based on the at least one third attribute, a sixth event being the third event type occurring at a sixth time that is in the time window and that is prior to the fifth time; and generating a third label for the sixth event occurring at the sixth time.

In some implementations, the first event type is detecting an object and the at least one first attribute includes at least one of an identity associated with the object, a speed of the object, a size of the object, or a location of the object.

In some implementations, the first event is recognized by a software model when a confidence metric associated with the first event is above a predetermined threshold.

Some implementations further comprise: updating the software model using the second event and the first label to generate an updated software model; and identifying the third event being the first event type occurring at a third time after the first time using the updated software model.

In some implementations, the identifying of the first event, the extracting of the at least one first attribute, the identifying of the second event, and the generating of the first label are performed by the processor offline, the processor not located with the autonomous vehicle.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A computer-implemented method comprising:
   determining, by a computing system, an attribute associated with occurrence of a first event identified by a machine learning model, the first event associated with a first event type;
   based at least in part on the attribute, identifying, by the computing system, occurrence of a second event associated with the first event type or a second event type, the second event not associated with a correct event type prior to identification of the occurrence of the first event;
   labeling, by the computing system, the second event with a label based on association of the second event with the first event type or the second event type; and
   re-training, by the computing system, the machine learning model based on the second event and the label.

2. The computer-implemented method of claim 1, wherein the first event is identified from sensor data captured by sensor of a vehicle.

3. The computer-implemented method of claim 1, wherein the label is indicative of a false-negative when the second event is associated with the first event type, and the label is indicative of a false-positive when the second event is associated with the second event type.

4. The computer-implemented method of claim 1, wherein the occurrence of the second event is associated with a value of an attribute that is within a predetermined range of a value of the attribute associated with the first event.

5. The computer-implemented method of claim 1, wherein the first event type or the second event type is associated with discrepancy between expected movement of a vehicle and actual movement of the vehicle.

6. The computer-implemented method of claim 1, wherein the first event type or the second event type is associated with cutting in by a vehicle.

7. The computer-implemented method of claim 1, wherein the first event type or the second event type is associated with discrepancy between expected movement of an object near a vehicle and actual movement of the object.

8. The computer-implemented method of claim 1, wherein the first event type or the second event type is associated with an object at a shoulder of a drivable area adjacent to a vehicle.

9. The computer-implemented method of claim 1, wherein occurrence of a third event associated with the first event type is identified based on the retrained machine learning model after identification of the occurrence of the first event.

10. The computer-implemented method of claim 1, wherein the occurrence of the second event occurs prior or subsequent to the occurrence of the first event.

11. A system comprising:
    at least one processor; and
    a memory storing instructions that, when executed by the at least one processor, cause the system to perform operations comprising:
    determining an attribute associated with occurrence of a first event identified by a machine learning model, the first event associated with a first event type;
    based at least in part on the attribute, identifying occurrence of a second event associated with the first event type or a second event type, the second event not associated with a correct event type prior to identification of the occurrence of the first event;
    labeling the second event with a label based on association of the second event with the first event type or the second event type; and
    re-training the machine learning model based on the second event and the label.

12. The system of claim 11, wherein the first event is identified from sensor data captured by sensor of a vehicle.

13. The system of claim 11, wherein the label is indicative of a false-negative when the second event is associated with the first event type, and the label is indicative of a false-positive when the second event is associated with the second event type.

14. The system of claim 11, wherein the occurrence of the second event is associated with a value of an attribute that is within a predetermined range of a value of the attribute associated with the first event.

15. The system of claim 11, wherein the first event type or the second event type is associated with discrepancy between expected movement of a vehicle and actual movement of the vehicle.

16. A non-transitory computer-readable storage medium including instructions that, when executed by at least one processor of a computing system, cause the computing system to perform operations comprising:

determining an attribute associated with occurrence of a first event identified by a machine learning model, the first event associated with a first event type;

based at least in part on the attribute, identifying occurrence of a second event associated with the first event type or a second event type, the second event not associated with a correct event type prior to identification of the occurrence of the first event;

labeling the second event with a label based on association of the second event with the first event type or the second event type; and re-training the machine learning model based on the second event and the label.

17. The non-transitory computer-readable storage medium of claim 16, wherein the first event is identified from sensor data captured by sensor of a vehicle.

18. The non-transitory computer-readable storage medium of claim 16, wherein the label is indicative of a false-negative when the second event is associated with the first event type, and the label is indicative of a false-positive when the second event is associated with the second event type.

19. The non-transitory computer-readable storage medium of claim 16, wherein the occurrence of the second event is associated with a value of an attribute that is within a predetermined range of a value of the attribute associated with the first event.

20. The non-transitory computer-readable storage medium of claim 16, wherein the first event type or the second event type is associated with discrepancy between expected movement of a vehicle and actual movement of the vehicle.

* * * * *